(12) United States Patent
Fujiuchi et al.

(10) Patent No.: US 8,525,068 B2
(45) Date of Patent: Sep. 3, 2013

(54) PLASMA TORCH WITH SWIRL-INDUCING NOZZLE AND METHOD OF USING SAME

(75) Inventors: Hiroki Fujiuchi, Tochigi (JP); Shinya Ohyama, Tochigi (JP); Toshiyuki Horimukai, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/391,403

(22) PCT Filed: Sep. 6, 2010

(86) PCT No.: PCT/JP2010/065264
§ 371 (c)(1),
(2), (4) Date: Feb. 21, 2012

(87) PCT Pub. No.: WO2011/030738
PCT Pub. Date: Mar. 17, 2011

(65) Prior Publication Data
US 2012/0145681 A1    Jun. 14, 2012

(30) Foreign Application Priority Data
Sep. 10, 2009    (JP) .................................. 2009-208980

(51) Int. Cl.
*B23K 10/00* (2006.01)
(52) U.S. Cl.
USPC .............. 219/121.46; 219/121.45; 219/121.5; 219/75; 313/231.51
(58) Field of Classification Search
CPC ........... H05H 1/34; B23K 10/00; B23K 10/02
USPC .............. 219/121.45, 121.46, 121.5, 121.51, 219/121.59, 75; 313/231.31, 231.51
See application file for complete search history.

(56) References Cited

U.S. PATENT DOCUMENTS

| | | | | |
|---|---|---|---|---|
| 8,089,025 | B2* | 1/2012 | Sanders .................... | 219/121.49 |
| 2006/0237399 | A1* | 10/2006 | Horner-Richardson et al. ......................... | 219/121.51 |
| 2006/0289398 | A1* | 12/2006 | Cook et al. ................. | 219/121.5 |
| 2007/0262060 | A1* | 11/2007 | Roberts et al. ............. | 219/121.5 |

FOREIGN PATENT DOCUMENTS

| | | |
|---|---|---|
| JP | 62-028084 A | 2/1987 |
| JP | 63-56977 U | 4/1988 |
| JP | 4-206399 A | 7/1992 |
| JP | 7-241682 A | 9/1995 |
| JP | 3205540 B2 | 9/2001 |
| JP | 2005-138151 A | 6/2005 |
| JP | 2005-279653 A | 10/2005 |
| JP | 2008-284580 A | 11/2008 |

* cited by examiner

*Primary Examiner* — Mark Paschall
(74) *Attorney, Agent, or Firm* — Carrier Blackman & Associates, P.C.; William D. Blackman; Joseph P. Carrier

(57) ABSTRACT

A plasma torch 1 used in plasma-arc welding is provided with a rod-shaped electrode 10, a first cylindrical nozzle 11 which is provided to surround the electrode 10 and which injects a plasma gas and a second cylindrical nozzle 12 which is provided to surround the first nozzle 11 and which injects a shielding gas. A second injection opening 121 of the second nozzle 12 directs in a substantially parallel direction with respect to an axial direction of the electrode 10 or in a direction being away from the electrode 10, and a plurality of groove portions inclining with respect to the axial direction of the electrode 10 are formed in an outer circumferential surface of the first nozzle 11 or an inner circumferential surface of the second nozzle 12.

9 Claims, 4 Drawing Sheets

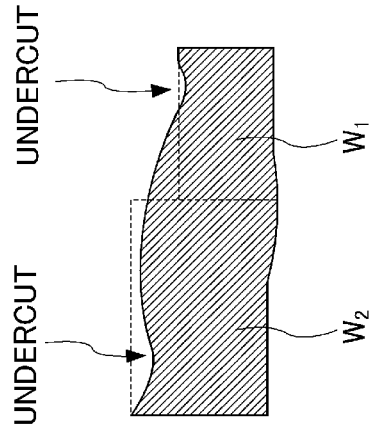
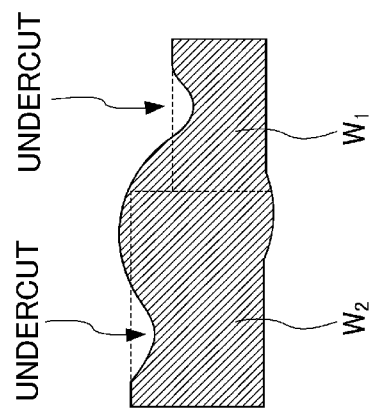
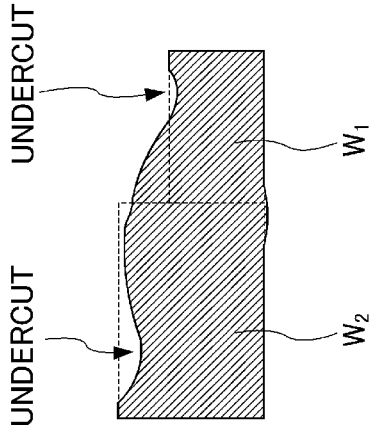

PLASMA TORCH WITH SWIRL-INDUCING NOZZLE AND METHOD OF USING SAME

TECHNICAL FIELD

The present invention relates to a plasma torch and a plasma-arc welding method, and more particularly to a plasma torch for plasma-arc welding and a plasma-arc welding method.

BACKGROUND ART

Conventionally, plasma-arc welding has been known. In this plasma-arc welding, a welding plasma torch is used. This welding plasma torch includes, for example, a rod-shaped electrode, a first nozzle which is provided to surround the electrode and which injects a plasma gas and a second nozzle which is provided to surround the first nozzle and which injects a shielding gas (refer to Patent Document 1).

According to this welding plasma torch, a voltage is applied between the electrode and a material to be welded to generate an electric arc while injecting the plasma gas from the first nozzle. As this occurs, the second nozzle injects the shielding gas so as to surround the electric arc to prevent nitrogen and oxygen in the atmosphere from flowing into a molten weld portion.

Incidentally, it is practiced to form a tailored blank material by butt welding two types of sheet materials having different thicknesses. In this case, when the welding plasma torch described above is used, a base material is dented along both edges of a weld bead to thereby form undercuts. In particular, in the sheet material which is thin, the thickness of the portion where the undercut is formed is largely reduced.

Consequently, there have been fears that a strength of the tailored blank material cannot be ensured.

PRIOR ART DOCUMENT

Patent Document

Patent Document 1: JP-A-2008-284580

SUMMARY OF INVENTION

One or more embodiments of the invention provide a plasma torch and a plasma-arc welding method which can ensure strength of workpieces after welding, when welding workpieces having different thickness together.

According to one or more embodiments of the invention, a plasma torch (for example, a plasma torch 1 which will be described later) for use in plasma-arc welding is provided with a rod-shaped electrode (for example, an electrode 10 to be described later), a first nozzle (for example, a first nozzle 11 to be described later) which is provided to surround the electrode and which injects a plasma gas, and a second nozzle (for example, a second nozzle 12 to be described later) which is provided to surround the first nozzle and which injects a shielding gas. An injection opening of the second nozzle (for example, a second injection opening 121 to be described later) directs in a substantially parallel direction relative to an axial direction of the electrode or in a direction being away from the electrode. A plurality of groove portions (for example, groove portions 141 to be described later) inclining with respect to the axial direction of the electrode are formed in an outer circumferential surface of the first nozzle or an inner circumferential surface of the second nozzle.

According to the structure described above, a voltage is applied between the electrode and the workpieces to form an electric arc while the plasma gas is injected from the first nozzle, and the shielding gas is injected from the second nozzle so as to surround a periphery of the electric arc. The plurality of groove portions inclining with respect to the axial direction of the electrode are formed in the outer circumferential surface of the first nozzle or the inner circumferential surface of the second nozzle. Consequently, the shielding gas injected from the second nozzle flows spirally to be sprayed to a surface of a molten weld pool in a direction in which the shielding gas rotates about the electric arc as a rotating center.

When the plasma arc is moved in a welding direction in this state, the molten weld pool extends towards a rear side of the plasma arc when viewed from thereabove. Then, molten metal at the rear side of the traveling direction of the plasma arc is pushed to be propelled by the sprayed shielding gas.

Thus, when welding together the workpieces having different thicknesses, by propelling the molten metal at the rear side of the traveling direction of the plasma arc towards the workpiece which is thin by spraying the shielding gas onto the surface of the molten weld pool, a dented portion in a base material of the thin workpiece can be filled with the molten metal so propelled. As a result, a reduction in thickness of the thin workpiece due to an undercut can be prevented to thereby ensure the strength of the workpiece after welding.

In addition, the injection opening of the second nozzle directs in the substantially parallel direction to the axial direction of the electrode or in the direction being away from the electrode. In the event that the injection opening in the second nozzle directs in the direction being away from the electrode, when a shielding gas is injected from the second nozzle, the injected shielding gas spreads in directions being away from the electric arc. Consequently, since the shielding gas does not directly strike the electric arc, a disturbance to the electric arc can be prevented, and the welding is stabilized.

In addition, in the event that the injection opening in the second nozzle is directed in the substantially parallel direction with respect to the axial direction of the electrode, even though a shielding gas is injected from the second nozzle, the shielding gas injected spreads in directions being away from the electrode due to a negative pressure being produced on an outside of the injection opening in the second nozzle.

Consequently, since the shielding gas does not directly strike the electric arc, the disturbance to the electric arc can be prevented, and the welding is stabilized.

Here, a cutting plasma torch is disclosed in JP-B2-3205540. In this cutting plasma torch, however, since shielding gas directly strikes an electric arc, the electric arc is disturbed, leading to fears that welding is not stabilized.

The groove portions may extend to the injection opening in the second nozzle.

In a cutting plasma torch disclosed in JP-B2-3205540, the flow rate of shielding gas is large, and hence, molten metal in a molten weld pool is dispersed. On the contrary, when the flow rate of shielding gas is small, this time, the plasma gas becomes unstable, and the molten metal cannot be propelled sufficiently. On the other hand, in the event that the groove portions are extended to the injection opening of the second nozzle, even when the flow rate of shielding gas is small, the molten metal can be propelled in an ensured fashion while stabilizing the plasma gas.

The injection opening of the second nozzle may position in a side of a base end of the electrode with respect to the injection opening of the first nozzle in the axial direction.

When the injection opening of the second nozzle is situated in the same position as or further distal than the injection opening of the first nozzle in the axial direction, shielding gas injected from the second nozzle easily strikes directly the electric arc, leading to a problem that the electric arc is disturbed. On the other hand, the injection opening of the second nozzle is situated further proximal to the base end of the electrode than the injection opening of the first nozzle with respect to the axial direction, the shielding gas is prevented from directly striking the electric arc to thereby prevent the disturbance to the electric arc.

In addition, according to one or more embodiments of the invention, a plasma-arc welding method includes injecting a shielding gas so as to spirally flow along a surface of an electric arc to thereby be sprayed onto a surface of a molten weld pool and propelling molten metal in the molten weld pool in a predetermined direction by the shielding gas so sprayed.

According to the method described above, the molten metal in the molten weld pool is propelled in the predetermined direction by the sprayed shielding gas. Thus, in welding together workpieces having different thicknesses, by propelling molten metal towards a thin workpiece, a dented portion in a base material of the thin workpiece is filled with the molten metal so propelled. As a result, the reduction in thickness of the thin workpiece due to the undercut that would otherwise be left as it is can be prevented, thereby making it possible to ensure the strength of the workpiece after welding. In addition, since the shielding gas is injected so as to flow spirally along the surface of the electric arc, the shielding gas is prevented from striking directly the electric arc, whereby the disturbance to the electric arc can be prevented, and the welding is stabilized. Additionally, since the shielding gas is sprayed onto the surface of the molten weld pool to thereby propel the molten metal in the predetermined direction, arising in the molten weld pool can be leveled before a molten weld portion is solidified. In addition, compared with a case where the molten metal in the molten weld pool is propelled by a wire, the flow rate can be increased. Additionally, compared with a case where the molten metal in the molten weld pool is propelled by a magnetic field, the facility can be made small in size, and moreover, even in the event that a forward angle is set on the electric arc, a heat reduction resulting from the electric arc being bent can be prevented.

In butt welding together workpieces having different thickness, the shielding gas may be injected so that the flow of molten metal at the rear of the traveling direction of the electric arc in the molten weld pool is directed towards a workpiece which is thin.

When the workpieces having different thicknesses are butt welded together by injecting a shielding gas so that the molten metal at the rear of the traveling direction of the electric arc in the molten weldpool is directed towards the thin workpiece, the molten metal at the rear of the traveling direction of the plasma arc is pushed to be propelled towards the thin workpiece by the shielding gas sprayed. Then, a dented portion in a base material of the thin workpiece is filled with the molten metal so propelled. As a result, the reduction in thickness of the thin workpiece due to the undercut that would otherwise be left as it is can be prevented so as to ensure the strength of the workpiece after welding.

Other aspects and advantages of the invention will be apparent from the following description and the appended claims.

BRIEF DESCRIPTION OF DRAWINGS

FIGS. 5(a) and 5(b) are drawings showing experimental results of comparison examples, and FIG. 5(c) is a drawing showing an experimental result of an example of the invention.

DESCRIPTION OF EMBODIMENTS

Figure 1:
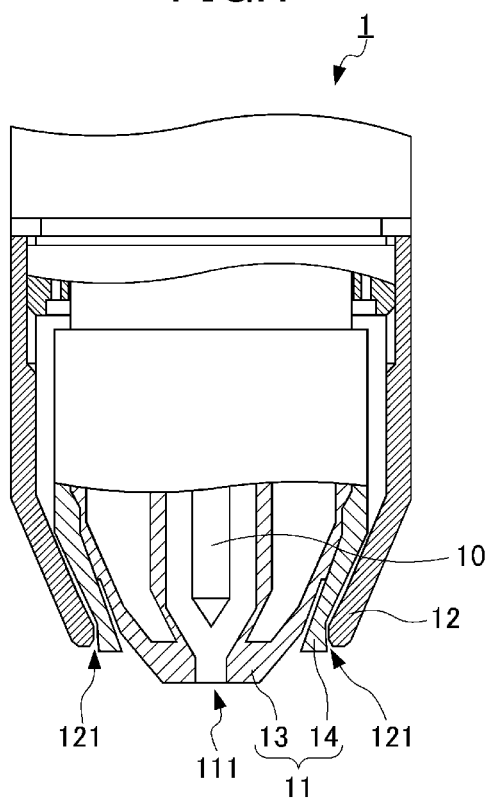
FIG. 1 is a sectional view of a plasma torch according to an exemplary embodiment of the invention.

Hereinafter, an exemplary embodiment of the invention will be described based on the drawings. FIG. 1 is a sectional view of a plasma torch 1 according to the exemplary embodiment.

The plasma torch 1 includes a rod-shaped electrode 10, a first cylindrical nozzle 11 which is provided to surround the electrode 10 and which injects a plasma gas and a second cylindrical nozzle 12 which is provided to surround the first nozzle 11 and which injects a shielding gas.

A first circular injection opening 111 is formed at a distal end of the first nozzle 11, and a plasma gas is injected through this first injection opening 111. The first nozzle 11 includes an inner cylindrical portion 13 having a cylindrical shape and an outer cylindrical portion 14 which is provided to surround the inner cylindrical portion 13.

Figure 2:
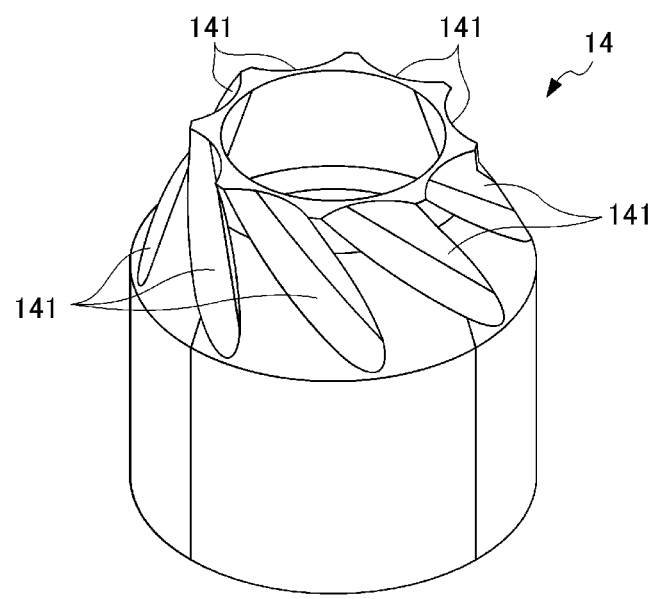
FIG. 2 is a perspective view of a first nozzle of the plasma torch according to the embodiment.

FIG. 2 is a perspective view of the outer cylindrical portion 14 of the first nozzle 11. A distal end portion of the outer cylindrical portion 14 has a substantially conical shape which becomes thinner in diameter as it extends towards a distal end thereof. In addition, a plurality of groove portions 141, which are inclined with respect to an axial direction of the electrode 10, are formed in an outer circumferential surface of the distal end portion of the outer cylindrical portion 14. These groove portions 141 extend as far as the distal end of the outer cylindrical portion 14.

Returning to FIG. 1, a second injection opening 121 having an annular configuration is formed at a distal end of the second nozzle 12. A shielding gas is injected through this second injection opening 121. The injection opening 121 of the second nozzle 12 is directed in a direction in which the injection opening 121 moves farther away from the electrode 10 as the injection opening 121 extends closer to a distal end thereof.

Note that the injection opening 121 in the second nozzle 12 may be directed in a substantially parallel direction relative to the axial direction of the electrode 10. In addition, the injection opening 121 in the second nozzle 12 is positioned further proximal than the injection opening 111 in the first nozzle with respect to the axial direction of the electrode 10. Then, the groove portions 141 of the first nozzle 11 extend as far as the injection opening 121 in the second nozzle 12.

Next, referring to FIGS. 3 and 4, a plasma-arc welding employing the plasma torch 1 will be described. Specifically, a workpiece W1 which is a thin sheet material and a workpiece W2 which is a sheet material whose thickness is thicker than the workpiece W1 are butt welded together so as to form a tailored blank material.

Firstly, an electric arc A is generated by applying a voltage between the electrode 10 and the workpieces W1, W2 while a plasma gas is being injected from the first injection opening 111 in the first nozzle 11. In addition, a shielding gas is injected from the second injection opening 121 in the second nozzle 12 so as to surround the periphery of the electric arc A.

Figure 3:
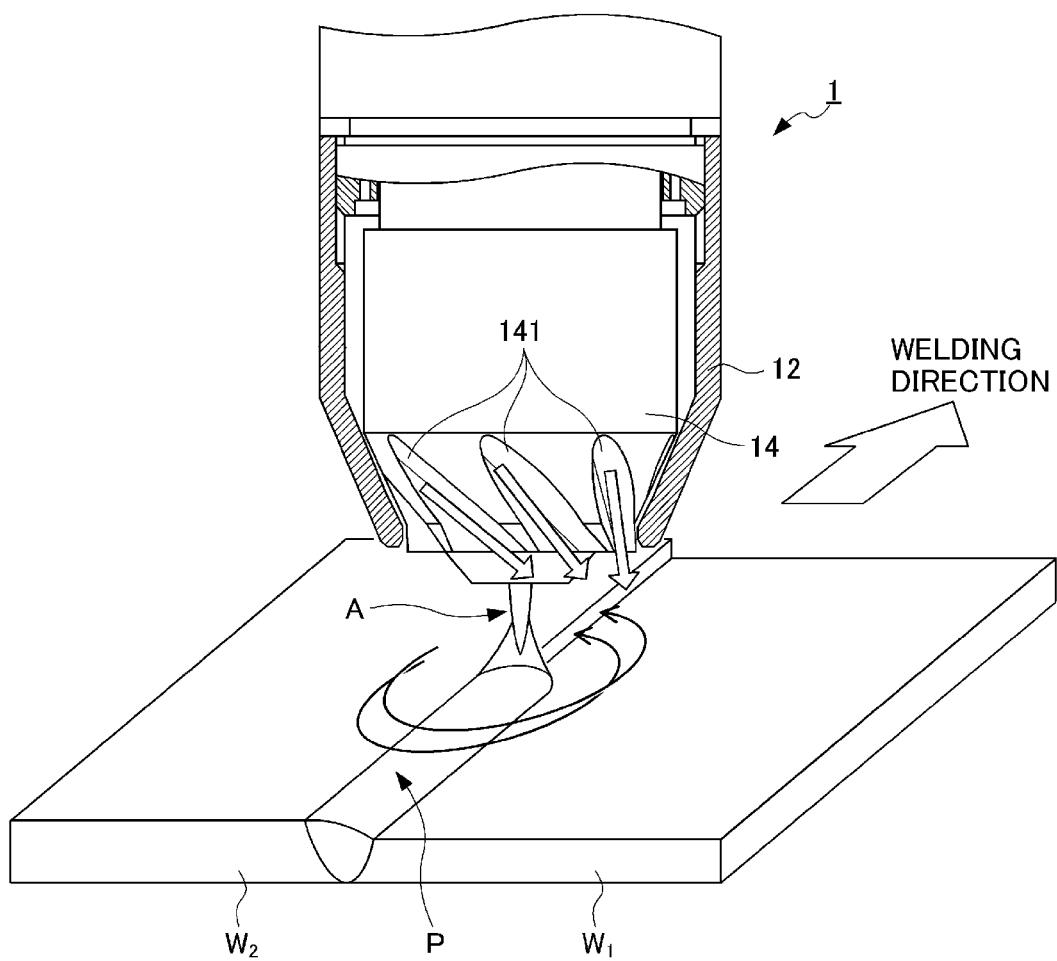
FIG. 3 is a perspective view which depicts the operation of the plasma torch according to the embodiment.

Then, the shielding gas flows in directions indicated by white arrows each fringed by a black solid line in FIG. 3 along the plurality of groove portions 141 and is injected from the second injection opening 121. This shielding gas so injected flows spirally along a surface of the electric arc A while spreading in directions in which it moves away from the electric arc A and is sprayed onto a surface of a molten weld pool P in a direction in which the shielding gas turns about the electric arc A as a turning center, that is, in directions indicated by black arrows in FIG. 3. Specifically, as is shown in FIG. 4, the shielding gas is sprayed against eight locations on the workpieces W1, W2, and the shielding gas flows at those eight locations in a direction indicated by a black arrow in FIG. 4.

Figure 4:
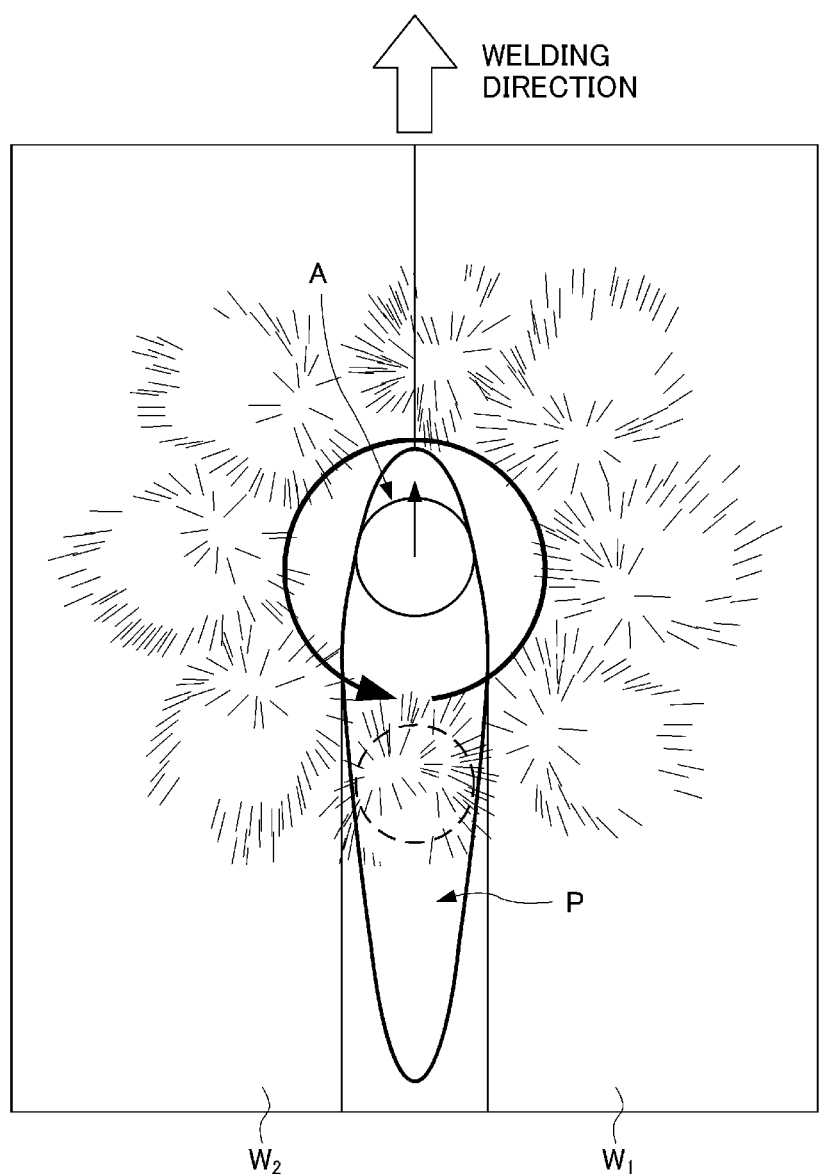
FIG. 4 is a plan view which depicts the operation of the plasma torch according to the embodiment.

When the electric arc A is moved in a welding direction in this state, the molten weld pool P extends towards the rear of the electric arc A when viewed from thereabove, as is shown in FIG. 4. Consequently, molten metal lying in an area at the rear of the traveling direction of the electric arc A which is surrounded by a broken line in FIG. 4 is pushed to be propelled towards the thin workpiece W1 by the shielding gas so sprayed.

Then, a dented portion in a base material of the thin workpiece W1 is filled with the molten metal so propelled.

Hereinafter, an example according to the invention and comparison examples will be described. In Comparison Example 1, workpieces W1, W2 having different thicknesses were butt welded together by employing the conventional plasma torch.

In Comparison Example 1, a welding speed was 1 m/min. In Comparison Example 2, workpieces W1, W2 having different thicknesses were butt welded together by employing the conventional plasma torch. In Comparison Example 2, a welding speed was 1.5 m/min. In the example of the invention, workpieces W1, W2 having different thicknesses were butt welded together by employing the plasma torch of the invention. In the example of the invention, a welding speed was 1.5 m/min.

FIG. 5(a) shows an experimental result of Comparison Example 1, FIG. 5(b) shows an experimental result of Comparison Example 2, and FIG. 5(c) shows an experimental of the example of the invention. It is seen from these experimental results that with the welding speed of 1 m/min, which is slow, although an undercut in the thin workpiece W1 is relatively small, the undercut in the thin workpiece W1 becomes large when the welding speed is increased to 1.5 m/min. In contrast with this, in the case of the plasma torch of the invention being employed, it is seen that an undercut in the thin workpiece W1 can be kept small even in the event that the welding speed is increased to 1.5 m/min.

According to the exemplary embodiment described above, the following advantages are provided.

(1) A voltage is applied between the electrode 10 and the workpieces W1, W2 to form an electric arc while the plasma gas is being injected from the first nozzle 11, and the shielding gas is injected from the second nozzle 12 so as to surround the periphery of the electric arc. As this occurs, the plurality of groove portions 141 which are inclined with respect to the axial direction of the electrode 10 are formed in the outer circumferential surface of the first nozzle 11. Consequently, the shielding gas injected from the second nozzle 12 flows spirally to be sprayed onto the surface of the molten weld pool P in the direction in which the shielding gas turns about the electric arc A as a turning center. When the electric arc A is moved in the welding direction in this state, the molten weld pool P extends towards the rear of the electric arc A when viewed from thereabove. Consequently, the molten metal at the rear of the traveling direction of the electric arc A is pushed to be propelled in the predetermined direction by the sprayed shielding gas. Thus, when welding together the workpieces having different thicknesses, by propelling the molten metal at the rear of the traveling direction of the electric arc A towards the thin workpiece W1 by spraying the shielding gas onto the surface of the molten weld pool P, a dented portion in a base material of the thin workpiece W1 can be filled with the molten metal so propelled. As a result, the reduction in thickness of the thin workpiece W1 due to the undercut can be suppressed to thereby ensure the strength of the workpiece after welding.

(2) Since the injection opening 121 in the second nozzle 12 is directed in the direction in which the injection opening 121 moves away from the electrode 10, when a shielding gas is injected from the second nozzle 12, the shielding gas injected spreads in directions in which the shielding gas moves away from the electric arc. Consequently, since the shielding gas does not strike directly the electric arc, the disturbance to the electric arc can be prevented, and the welding is stabilized.

(3) The groove portions 141 are extended as far as the second injection opening 121 in the second nozzle 12. By doing so, even in the event that the flow rate of shielding gas is reduced, the molten metal can be propelled in an ensured fashion while stabilizing the plasma gas.

(4) Since the second injection opening 121 in the second nozzle 12 is situated further distal than the first injection opening 111 in the first nozzle 11 with respect to the axial direction of the electrode 10, the shielding gas is prevented from striking directly the electric arc, thereby making it possible to prevent the disturbance to the electric arc.

Note that the invention is not limited to the exemplary embodiment, and hence, modifications or improvements made thereto without departing from the scope where the object of the invention can be attained are to be included in the invention.

DESCRIPTION OF REFERENCE NUMERALS AND CHARACTERS 1 plasma torch; 10 electrode; 11 first nozzle; 12 second nozzle; 111 first injection opening; 121 second injection opening; 141 groove portion; P molten weld pool; W1, W2 workpiece.

The invention claimed is:

1. A plasma torch for plasma-arc welding comprising:
a rod-shaped electrode;
a first cylindrical nozzle surrounding the electrode and configured to inject a plasma gas; and
a second cylindrical nozzle surrounding the first nozzle and configured to inject a shielding gas,
wherein an injection opening of the second nozzle spreads in a substantially parallel direction relative to an axial direction of the electrode or in a direction away from the electrode,
wherein a plurality of groove portions inclining with respect to the axial direction of the electrode are formed in an outer circumferential surface of the first nozzle or an inner circumferential surface of the second nozzle, and
wherein the plasma torch is configured such that when butt-welding together two workpieces having different thicknesses, including a thinner workpiece and a thicker workpiece, the grooves incline so as to direct a flow of the shielding gas toward the thinner workpiece.

2. The plasma torch according to claim 1, wherein the groove portions extend to the injection opening of the second nozzle.

3. The plasma torch according to claim 1, wherein the injection opening of the second nozzle positions in a side of a distal end of the electrode in the axial direction with respect to an injection opening of the first nozzle.

4. The plasma torch according to claim 1, wherein the first cylindrical nozzle comprises an inner cylindrical portion and an outer cylindrical portion which is formed separately from, and provided to surround the inner cylindrical portion.

5. A plasma-arc welding method comprising
injecting a shielding gas so as to spirally flow along a surface of an electric arc to thereby be sprayed onto a surface of a molten weld pool when two workpieces having different thicknesses are butt-welded together; and
propelling molten metal in the molten weld pool toward a thinner one of the two workpieces by the sprayed shielding gas.

6. The plasma-arc welding method according to claim 5, further comprising:
aligning said workpieces in an abutting side-by-side configuration, wherein a first of said workpieces has a first thickness and a second of said workpieces has a second thickness which is greater than the first thickness, wherein the molten weld pool is formed at a junction between the first and second workpieces; and
injecting the shielding gas so that the molten metal at a rear side of a traveling direction of the electric arc within the molten weld pool is directed towards the first workpiece, to thereby butt-weld the workpieces having different thicknesses together.

7. A plasma torch for plasma-arc welding, comprising:
a rod-shaped electrode;
a first cylindrical nozzle surrounding the electrode and configured to inject a plasma gas, the first cylindrical nozzle comprising an inner cylindrical portion and an outer cylindrical portion which is formed separately from, and provided to surround the inner cylindrical portion, the outer cylindrical portion including a tip portion having a scalloped outer periphery; and
a second cylindrical nozzle surrounding the first nozzle and configured to inject a shielding gas,
wherein an injection opening of the second nozzle spreads in a substantially parallel direction relative to an axial direction of the electrode or in a direction away from the electrode, and
wherein a plurality of groove portions inclining with respect to the axial direction of the electrode are formed in an outer circumferential surface of the outer cylindrical portion of the first nozzle to direct a flow of the shielding gas, the groove portions extending to the injection opening of the second nozzle.

8. The plasma torch according to claim 7, wherein the injection opening of the second nozzle is situated laterally with respect to a distal end of the electrode, and laterally with respect to an injection opening of the first nozzle.

9. The plasma torch according to claim 7, wherein the injection opening of the second nozzle extends away from the electrode as the injection opening extends closer to a distal end thereof.

* * * * *